United States Patent [19]

Malamy et al.

[11] Patent Number: 5,353,425
[45] Date of Patent: Oct. 4, 1994

[54] METHODS AND APPARATUS FOR IMPLEMENTING A PSEUDO-LRU CACHE MEMORY REPLACEMENT SCHEME WITH A LOCKING FEATURE

[75] Inventors: Adam Malamy, Winchester, Mass.; Rajiv N. Patel, San Jose; Norman M. Hayes, Sunnyvale, both of Calif.

[73] Assignee: Sun Microsystems, Inc., Mountain View, Calif.

[21] Appl. No.: 875,357

[22] Filed: Apr. 29, 1992

[51] Int. Cl.⁵ .............................................. G06F 13/14
[52] U.S. Cl. ........................... 395/425; 364/DIG. 1; 364/243.41; 364/246.13; 364/246.8
[58] Field of Search ............................... 395/425, 400; 364/DIG. 1

[56] References Cited

U.S. PATENT DOCUMENTS 5,029,072 7/1991 Moyer et al. .................... 395/425
5,249,286 9/1993 Alpert et al. .................... 395/425

FOREIGN PATENT DOCUMENTS 0061570 10/1982 European Pat. Off. .
0278478 8/1988 European Pat. Off. .
0394115 10/1990 European Pat. Off. .
0459233 12/1991 European Pat. Off. .

OTHER PUBLICATIONS

U.S. Patent Application, Ser. No.: 07/875,356, Filed: Apr. 29, 1992 Title: Cache Set Tag Array Inventors: Adam Malamy, et al. (Our Reference: 82225.P332).
Daryl Odnert et al., "Architecture And Compiler Enhancements For PA-RISC Workstations", 36th IEEE Computer Society International Conference, Feb. and Mar. 1991, pp. 214–218.

Primary Examiner—David L. Robertson
Assistant Examiner—Reginald G. Bragdon
Attorney, Agent, or Firm—Blakely, Sokoloff, Taylor & Zafman

[57] ABSTRACT

In a memory system having a main memory and a faster cache memory, a cache memory replacement scheme with a locking feature is provided. Locking bits associated with each line in the cache are supplied in the tag table. These locking bits are preferably set and reset by the application program/process executing and are utilized in conjunction with cache replacement bits by the cache controller to determine the lines in the cache to replace. The lock bits and replacement bits for a cache line are "ORed" to create a composite bit for the cache line. If the composite bit is set the cache line is not removed from the cache. When deadlock due to all composite bits being set will result, all replacement bits are cleared. One cache line is always maintained as non-lockable. The locking bits "lock" the line of data in the cache until such time when the process resets the lock bit. By providing that the process controls the state of the lock bits, the intelligence and knowledge the process contains regarding the frequency of use of certain memory locations can be utilized to provide a more efficient cache.

13 Claims, 6 Drawing Sheets

PLRU

| Step | Action | MRU Bits 3210 | Status |
|------|--------|---------------|--------|
| 1 | Initial State | 0000 | Lines 0, 1, 2, and 3 available |
| 2 | Line 3 accessed | 1000 | Lines 0, 1, and 2 available |
| 3 | Line 1 accessed | 1010 | Lines 0 and 2 available |
| 4 | Line 0 accessed | 1011 | Line 2 available |
| 5 | Line 2 accessed | 0100 | Lines 0, 1, and 3 available; history was lost |
| 6 | Line 3 accessed | 1100 | Lines 0 and 1 available |

*Figure 2*
*(Prior Art)*

PTAG 400     STAG 410

|  | Line 0 | | Line 1 | | Line 2 | | Line 3 | | | MRU Bits for line: 0 1 2 3 | Lock Bits for line: 0 1 2 3 |
|---|---|---|---|---|---|---|---|---|---|---|---|
| Set 0 | Block Addr | Ctrl Bits | Block Addr | Ctrl Bits | | Ctrl Bits | | | 0 | | |
| Set 1 | Block Addr | Ctrl Bits | Block Addr | Ctrl Bits | Block Addr | Ctrl Bits | | | 1 | | |
| Set 63 | | | | | | | | | 63 | | |

*Figure 5*

PLRU + Locking

| Action | Replacement Bits 3210 | Lock Bits 3210 | Composite Mask 3210 | Status |
|---|---|---|---|---|
|  | 0000 | 0000 | 0000 | Initial Cond. |
| Line 3 is accessed | 1000 | 0000 | 1000 | Lines 0, 1, and 2 available |
| Line 2 is locked | 1000 | 0100 | 1100 | Lines 0 and 1 available |
| Line 2 is accessed | 1100 | 0100 | 1100 | Lines 0 and 1 available |
| Line 0 is accessed | 1101 | 0100 | 1101 | Line 1 available |
| Line 1 is accessed | 0010 | 0100 | 0110 | MRU bits cleared, lines 3 and 0 available |
| Line 3 is locked | 0010 | 1100 | 1110 | Line 0 available |
| Line 0 is accessed | 0001 | 1100 | 1101 | MRU bits cleared, line 1 available |
| Line 1 is locked | 0000 | 1110 | 1110 | MRU bits cleared, line 0 available |
| Line 0 is accessed | 0000 | 1110 | 1110 | Line 0 available |
| Line 1 is accessed | 0010 | 1110 | 1110 | Line 0 available |
| Line 2 is unlocked | 0010 | 1010 | 1010 | Lines 0 and 2 available |
| Line 0 is accessed | 0011 | 1010 | 1011 | Line 2 available |

*Figure 6*

METHODS AND APPARATUS FOR IMPLEMENTING A PSEUDO-LRU CACHE MEMORY REPLACEMENT SCHEME WITH A LOCKING FEATURE

BACKGROUND OF THE INVENTION

1. Field of the Invention

This invention relates to the field of computer cache memory devices. More particularly, the present invention relates to a method and apparatus for "locking" data into the cache memory such that a program can designate pages or blocks of memory which should remain in the cache.

2. Art Background

A simple way to increase the throughput of a computer processor is to increase the frequency of the clock driving the processor. However, when the processor clock frequency is increased, the processor may begin to exceed the speed at which the main memory can respond to the processor's requests. The processor may therefore be forced to wait for the main memory to respond. In order to alleviate this main memory latency period, cache memory was created.

Cache memory refers to a small amount of high-speed memory that is coupled closely to the processor. The cache memory is used to duplicate a subset of main memory locations. When a processor needs data from memory, it will first look into the high-speed cache memory. If the data is found in the cache memory (known as a "hit"), the data will be retrieved from the cache memory and execution will resume. If the data is not found in the cache memory (known as a "miss") then the processor will proceed to look into the slower main memory.

For example, if a particular program will refer to a particular data table in the main memory often, it would be desirable to place a copy of the data table into a high-speed cache memory. If a copy of the data table is kept in the cache memory, then each time the processor needs data from the data table it will be retrieved quickly.

Cache memories usually store only a small subset of the main memory. When every location in the cache memory is filled, the cache memory must discard some of the data from what is currently in store. Determining which memory cache locations to discard is a difficult task since it is often not known which cache memory locations will be needed in the future. Various heuristics have been developed to aid in determining which main memory locations will be duplicated in the high-speed cache memory.

Referring to FIG. 1, a high level block diagram of a prior art cache memory system is shown. The main memory 10, cache memory system 12 and processor 14 are coupled in a bus 16. The processor issues memory requests to the cache memory system 12. If the information is available in the cache memory 15 the information requested is immediately forwarded to processor 14 via a dedicated line 18. If the information is not located in the cache memory 15, the request is forwarded to the slower main memory 10, which provides the information requested to processor 14 via the bus 16.

There are many methods of mapping physical main memory addresses into the cache memory locations. Among these methods are: Fully associative, Direct Mapped, and Set Associative. In a fully associative cache system, any block of main memory can be represented in any cache memory line. In a direct mapped system, each block of main memory can be represented in only one particular cache memory location. In a set associative system, each block of main memory can only be placed into cache memory lines having the same set number. For more information on cache memory mapping systems, please refer to Hennessy, Patterson, *Computer Architecture: A Quantitative Approach*, Morgan Kaufman Press, 1990, page 408–410.

In order to control the operation of the cache memory, there is dedicated control logic referred to as the cache controller (17, FIG. 1). A TAG table is located within the cache controller. The TAG table is used for storing information used for mapping main memory physical addresses into a cache memory set and line address. In particular, the TAG table stores block address and related control bits for each cache memory line. The block address refers to the physical main memory block address that is currently represented in the cache memory line. The control bits store information such as whether or not the cache memory line has valid data. In addition, the table stores data utilized to implement a cache replacement algorithm. The data table is divided to match the organization of the cache memory.

When all the lines in a cache memory set become full and a new block of memory needs to be placed into the cache memory, the cache controller must discard the contents of part of the cache memory and replace it with the new data from main memory. Preferably, the contents of the cache memory line discarded will not be needed in the near future. However, the cache controller can only predict which cache memory line should be discarded. As briefly noted earlier, in order to predict as efficiently as possible, several cache replacement heuristics have been developed. The presently used cache replacement heuristics include Round-Robin, Robin, Random, Least-Recently-Used (LRU), and Pseudo-Least-Recently-Used. These heuristics determine which cache memory location to replace by looking only at the cache memory's past performance.

The Round-Robin replacement heuristic simply replaces the cache memory lines in a sequential order. When the last cache memory line is reached, then the controller starts back at the first cache memory line.

The Least-Recently-Used (LRU) replacement scheme requires more intelligence at the cache controller. In the LRU heuristic, the assumption is that when a cache memory line has been accessed recently, it will most likely be accessed again in the near future. Based upon this assumption, then the cache memory line that that has been "least recently used" should be replaced by the cache controller. To implement the LRU heuristic, the cache controller must mark each cache memory line with a time counter each time there is a "hit" on that cache memory line. When the cache controller is forced to replace a cache memory line, the cache controller replaces the cache memory line with the oldest time counter value. In this manner the cache memory line which was "least recently used" will be replaced.

Although the LRU heuristic is relatively efficient, it does have drawbacks. One problem with the LRU replacement scheme is that it wastes valuable high-speed cache memory. Each time a cache hit occurs, the cache controller must place a time counter value in memory location associated with the cache memory line. Another problem with the LRU replacement scheme is that it requires complex logic to implement. When a replacement must occur, the cache controller must compare all the cache memory line time counter values. This procedure wastes valuable time. When these factors are accounted for, the LRU scheme loses some of its efficiency.

The Pseudo-Least-Recently-Used (PLRU) replacement scheme is somewhat similar to the LRU replacement scheme except that it requires less complex logic and does not require much high-speed cache memory to implement. However, since the PLRU scheme employs shortcuts to speed up operation, the least recently accessed cache memory location is not always the location replaced. In the PLRU replacement scheme each cache memory line is assigned an MRU (or Most-Recently-Used) bit which is stored in the TAG table. The MRU bit for each cache memory line is set to a "1" each time a "hit" occurs on the cache memory line. Thus, a "1" in the MRU bit indicates that the cache memory line has been used recently. When the cache controller is forced to replace a cache memory line, the cache controller examines the MRU bits for each cache memory line looking for a "0". If the MRU bit for a particular cache memory line is set to a "1", then the cache controller does not replace that cache memory line since it was used recently. When the cache controller finds a memory line with the MRU bit set to "0", that memory line is replaced and the MRU bit associated with the cache memory line is then set to "1".

A problem could occur if the MRU bits for all the cache memory lines are set to "1". If this happened, all of the lines are unavailable for replacement thus causing a deadlock. To prevent this type of deadlock, all the MRU bits in the TAG are cleared except for the MRU bit being accessed when a potential overflow situation is detected. If the cache is set-associative, all the MRU bits in the TAG array for the set are cleared, except for the MRU bit being accessed, when a potential overflow situation is detected because all of the MRU bits for the set are set to "1".

The PLRU scheme is best explained by the use of an example. Referring to FIG. 2, an example of the PLRU replacement scheme is illustrated in a cache environment with 4 cache lines available. At step 1, all the MRU bits are cleared indicating that none of the cache lines have been used recently and all the cache lines are free for replacement. At step 2, a cache hit occurs on the data in line 3. The cache controller causes the MRU bit for line 3 to be set to "1", indicating that the data in line 3 has been used recently. Cache lines 0, 1, and 2 are still available. At step 3, a cache hit occurs on the data in line 1. The cache controller causes the MRU bit for line 1 to be set to "1", indicating that the data in line 1 has been used recently. At step 4, a cache hit occurs on the data in line 0. The cache controller similarly causes the MRU bit for line 0 to be set to "1", indicating that the data in line 0 has been used recently. Now, only Cache line 2 has not been marked as being used recently. At step 5, a cache hit occurs on the data in line 2. If the MRU bit for line 2 is set to a "1", all the MRU bits would be set to "1" (1111) and no cache lines would be available for replacement. This would be a case of cache deadlock. Instead, the cache controller causes all of the MRU bits to be cleared and sets the MRU bit for line 2 to a "1". Now lines 0, 1, and 3 are available for replacement. The act of clearing of all the MRU bits results in the loss of some cache history, but is required in order to avoid cache deadlock. The cache operations then continue as before.

However, these heuristics can be improved if some information is known about the cache memory's future usage. For example, if it is known that a certain cache memory location will be used in the near future, it would be best not replace that cache memory location. In the example given earlier, it was known that the program would access the data in the data table repeatedly. If the data table was placed into the cache memory in that case, it would be advantageous to be able to "lock" that cache memory location so that it could not be replaced. If this was done, then each time the program subsequently needed information from the data table it would always be found in the cache memory. Therefore, the data in the data table would always be quickly fetched from the cache memory instead of having to be retrieved from the slower main memory.

SUMMARY OF THE INVENTION

It is therefore the object of the present invention to provide an efficient method for replacing cache memory locations when the cache memory becomes full.

It is a further object of the present invention to provide a method and apparatus for allowing programs to lock certain cache memory locations into the cache memory so they will not be replaced.

It is a further object of the present invention to prevent a user from causing "deadlock" of the cache memory by not allowing the user to lock all the cache memory locations.

These and other objects are accomplished by the unique method and apparatus of the present invention. The method and apparatus of the present invention comprises a cache memory replacement scheme which utilizes locking bits. These locking bits are preferably set and reset by the application program/process executing and are utilized in conjunction with cache replacement bits by the cache controller to determine the lines in the cache to replace. The locking bits "lock" the line of data in the cache until such time when the process resets the lock bit. By providing that the process controls the state of the lock bits, the intelligence and knowledge the process contains regarding the frequency of use of certain memory locations can be utilized to provide a more efficient cache.

BRIEF DESCRIPTION OF THE DRAWINGS

The objects, features, and advantages of the present invention will be apparent to one skilled in the art from the following detailed description in which:

FIG. 2 illustrates an exemplary prior art pseudo-least-recently-used replacement process.

FIG. 5 illustrates the STAG and PTAG tables utilized in the preferred embodiment of the cache system of the present invention.

FIG. 6 illustrates a pseudo-least-recently-used replacement process employing locking bits.

DETAILED DESCRIPTION OF THE INVENTION

A cache which implements a least recently used replacement algorithm is provided with the ability to lock certain memory locations in the cache. If a memory location in the cache is locked, the information contained therein remains in the cache until the lock is removed and the cache replacement algorithm determines that the line of the cache should be replaced.

The tag table is provided with an additional bit, a lock bit, which is associated with each line of cache memory. Preferably this bit can be set by the process accessing that particular cache memory location. The advantage is the added intelligence and pre-existing knowledge provided by the application program or process accessing the cache. The application program has pre-existing knowledge as to the frequency of access of certain variables or memory during execution of the program. This is not readily apparent to the cache controller implementing the replacement algorithm. Thus, increased intelligence is provided to the cache replacement algorithm without unduly increasing the complexity of the cache controller or cache replacement algorithm.

In the following description, for purposes of explanation, specific nomenclature is set forth to provide a thorough understanding of the present invention. However, it will be apparent to one skilled in the art that these specific details are not required in order to practice the present invention. In other instances, well known circuits and devices are shown in block diagram form in order not to obscure the present invention unnecessarily. In particular, the present invention has been implemented using the set associative mapping system and a pseudo-least-recently-used replacement algorithm. However, as is apparent to one skilled in the art, the cache system of the present invention is not limited to cache memory systems with set associative mapping or to the pseudo-least-recently-used replacement algorithm.

Figure 1:
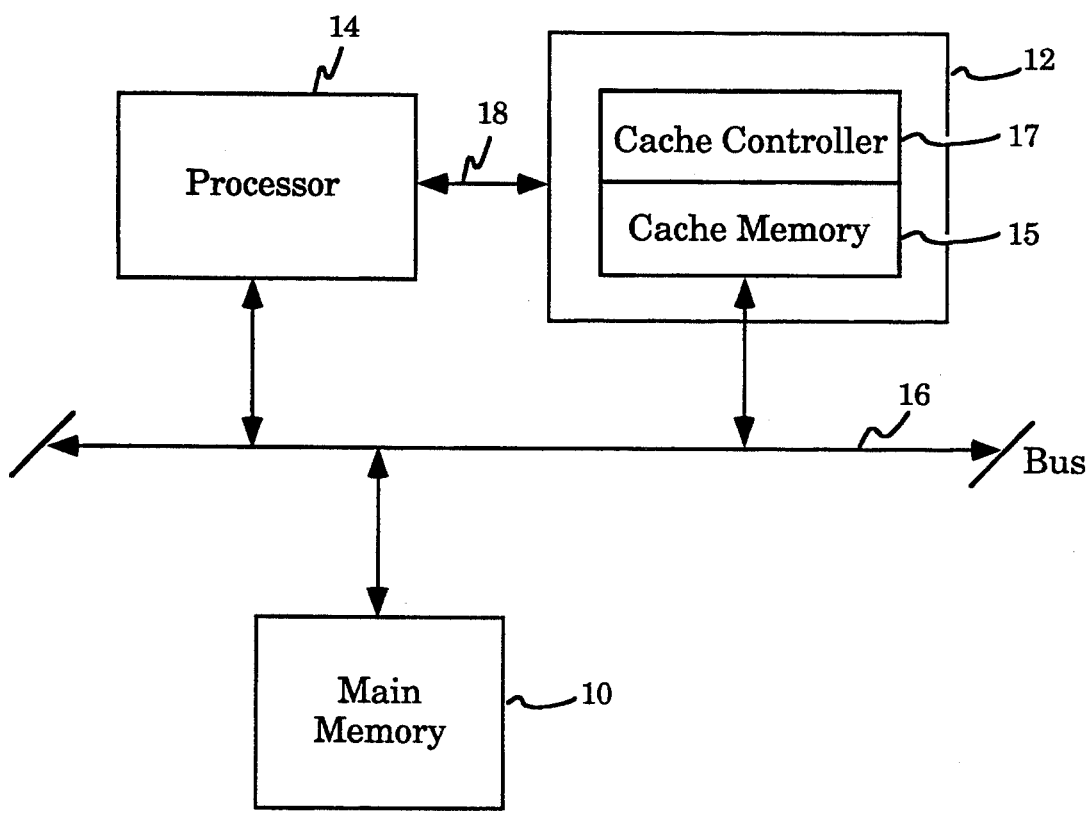
FIG. 1 is a high-level block diagram of a typical prior art cache memory system.
Figure 3:
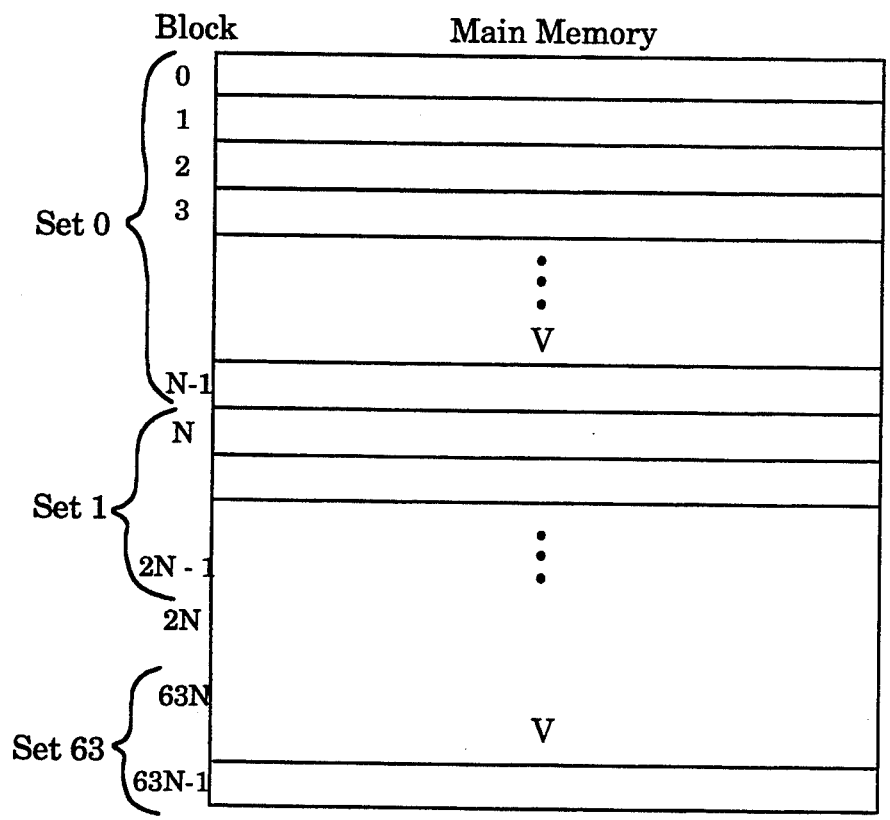
FIG. 3 illustrates a prior art set associative cache.
Figure 3:
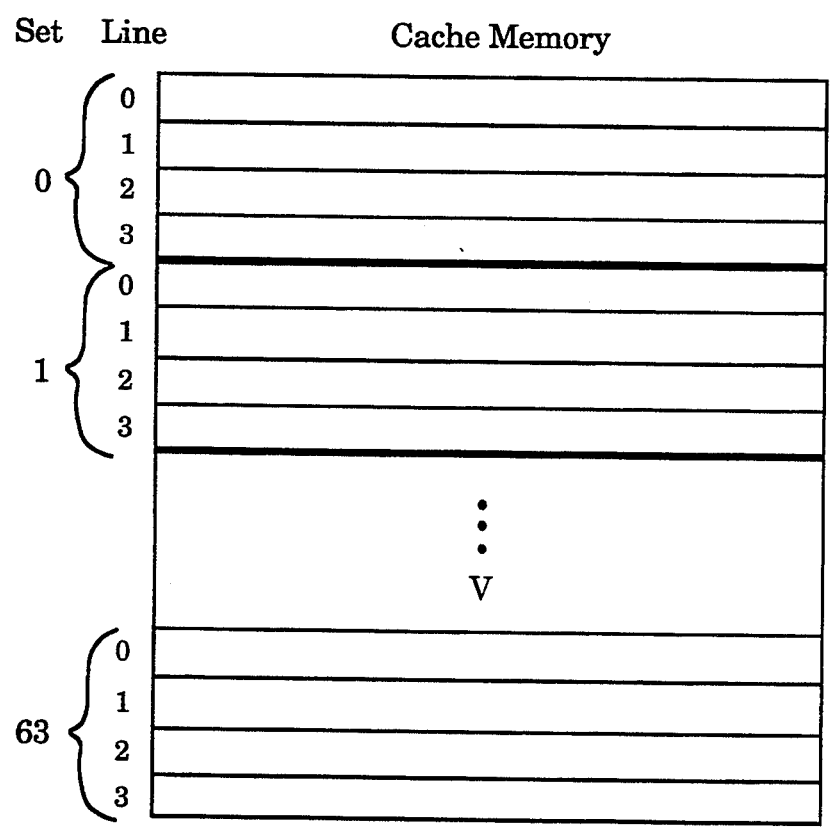

Referring to FIG. 3, a block diagram of a set exemplary of associative cache memory is shown. In the exemplary set associative cache memory system illustrated there are 64 cache memory "sets", each set is given a label from 0 to 63. Each set in the cache memory contains 4 "lines" of cache memory. Each line of cache memory in each set is given a label 0 through 3. Each cache memory line is capable of storing an entire "block" of main memory.

Like the cache memory, the main memory is also divided into a number of sets. The number of sets that the main memory is divided into is equal to the number of sets in the cache memory. For example, as shown in FIG. 3, the main memory is divided into 64 sets. The main memory is divided up according to the high order bits of the block address. Thus the first n blocks belong to set 0, the next n blocks belong to set 1, and so on. It is apparent that the sets could just as easily be divided using the low order bits of the block address such that all block addresses which end in 0 belong in set 0, and all block addresses which end in 1 belong to set 1. For example, set 0 encompasses blocks 0, N, 2N . . . 61N, 62N, 63N; and set 1 encompasses blocks 1, N+1, 2N+1 . . . 61N+1, 62N+1, 63N+1.

The main memory sets are considerably larger than the cache memory sets. Each set of main memory is then further divided into a number of memory blocks. Each block of main memory can only by duplicated in the cache memory having the same set number. For example, block 3 in set 0 can only be duplicated in set 0 of the cache memory and block n+1 in set 1 can only be duplicated in set 1 of cache memory.

As previously mentioned, each set of cache memory is made up of a number of "lines" of cache memory. The "lines" of cache memory are equal in size to the "blocks" of main memory and are used for storing duplicates of main memory blocks. Essentially, cache memory lines and main memory blocks are the same, except that "lines" only exist in the cache memory and blocks only exist in the main memory.

Figure 4A:
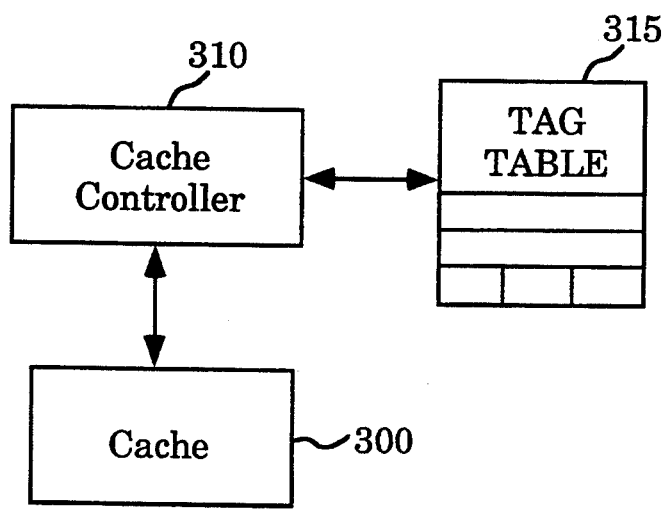
FIGS. 4a, 4b, and 4c illustrate a preferred embodiment of the cache system of the present invention and the locking bits employed.
Figure 4B:
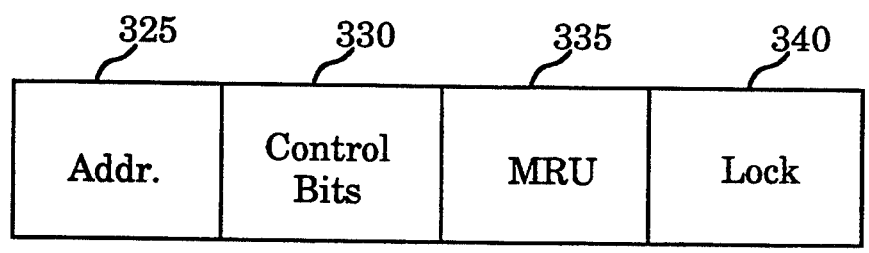
Figure 4C:
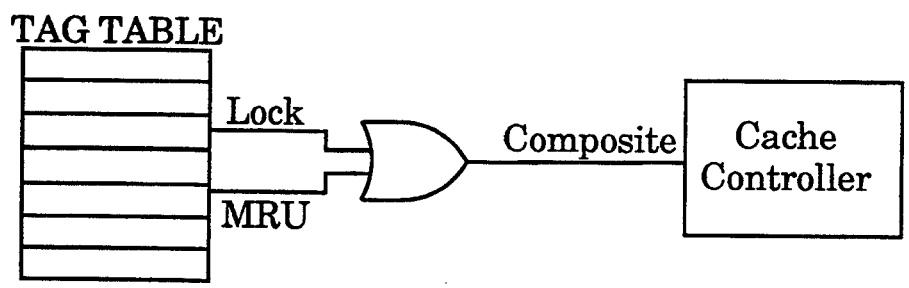

The locking mechanism for the cache system of the present invention may be conceptually described with reference to FIGS. 4a–4c. FIG. 4a shows cache 300 which contains the memory contents of addresses most recently accessed. Cache controller 310 controls the access to the cache 300 and implements the cache replacement algorithm to update the cache. The tag table 315 contains information regarding the memory or tag address of the data contained in the cache as well as control bits. Referring to FIG. 4b, an illustrative entry in the tag table is shown. One tag table entry is provided for each line in the cache. In addition to the address 325 and control bits 330, each entry is provided with a bit MRU 335 which is set when the cache at that particular line is accessed. This is utilized in the replacement algorithm implemented by the cache controller. In addition, a lock bit 340 is provided to prevent the line in the cache from being replaced. This lock bit is settable by the processor program accessing the cache and is similarly, resettable by that program when repeated access to that information is no longer required and the line in the cache can be replaced. In implementation, the concept may be visualized by reference to FIG. 4c. When the cache controller is required to replace a line in the cache, the cache controller accesses the tag table to read the MRU and lock data. Thus, the lock data and MRU data may be logically ORed together to result in a bit indicative of whether that particular line in the cache can be replaced. This logical OR function may be performed by the cache controller itself or by external logic. The OR function result is known as the Composite Bit. A collection of composite bits are referred to as a composite Mask. If the Composite bit for a particular cache line is set, then that cache line is not removed for replacement by a different memory location. Thus, regardless of the value of the MRU bit, the lock bit can be set to ensure that the data is maintained in the cache.

Preferably, the tag table is implemented as two separate tag tables as set forth in copending U.S. patent application Ser. No. 07/875,356, filed Apr. 29, 1992, titled "Cache Set Tag Array." This is shown in FIG. 5. The first table PTAG 400 comprises the address information and control bits. The address refers to the physical main memory block address that is currently represented in the cache memory line. Control bits include a valid bit which indicates if the cache memory line contains valid data. In addition, a second table STAG 410 is provided. The STAG contains the MRU bits and the lock bits for each line of cache memory. As noted earlier, the MRU bit is used for implementing a Pseudo-Least-Recently-Used replacement scheme.

The cache controller monitors the state of the composite mask to ensure that the composite mask never reaches the state where all the composite bits for all lines are set and cache deadlock occurs. In addition, to prevent all the cache memory lines from being locked by the user, it is preferred that a mechanism is provided to monitor the number of lock bits set and to inhibit additional lock requests by an application program if a predetermined number of lock bits are set. The mechanism may be provided in the cache controller, the program/process or compiler. Alternately, to avoid the locking of all cache lines, it is preferred that cache memory line 0 is controlled such that the lock bit is never set. This provides a simple low overhead solution to the problem and avoids deadlocks due to programmer errors.

Referring to FIG. 6, a sample use of the replacement scheme of the present invention is given. At the initial starting point in step 1, all the MRU bits and lock bits are cleared. In step 2, a cache hit occurs on the data in line 3. The cache controller causes the MRU bit for cache memory line 3 to be set to "1", indicating that the data in line 3 has been used recently. Cache lines 0, 1, and 2 are still available. Next in step 3, the user program locks the data located at line 2. The cache controller then sets the lock bit for cache memory line 2 to "1", indicating that the data in line 2 is now locked into the cache. The composite mask, created by the logical "OR" of the MRU bits and the lock bits is "1100", indicate that cache lines 0 and 1 are still available. In step 4, a hit occurs on the data in line 2. The cache controller causes the MRU bit for cache memory line 2 to be set to "1", indicating that the data in line 2 has been used recently. This composite mask remains "1100", indicating that cache lines 0 and 1 are still available. In step 5, a hit occurs on the data located at line 0. The cache controller causes the MRU bit for cache memory line 0 to be set to "1", indicating that the data in line 0 has been used recently. The resultant composite mask is "1101" indicating that only line 1 remains available for replacement.

In step 6, a hit occurs on the data in line 1. If the cache controller causes the MRU bit to be set to "1", the composite mask would be "1111". Instead, the cache controller causes the MRU bits to be reset and the MRU bit for cache memory line 1 to be set to "1", indicating that the data in line 1 has been used recently. The resultant composite mask is now "0110" as the lock bit for line 2 remains set. In step 7, the user program executes an instruction to lock the data in line 3. The cache controller carries out this instruction by causing the lock bit for line 3 to be set to "1". In step 8, a cache hit occurs on line 0. Again, the cache controller must clear the MRU bits to prevent a composite mask of "1111" from occurring. In step 9, the user locks cache memory line 1. Now all the cache memory lines that can be locked are locked. To prevent the cache memory from being deadlocked, the system clears the MRU bits. Only cache memory line 0 is available for replacement when all the other lines are locked. In step 10, a hit occurs on line 0. The MRU bit for line 0 is not set by the cache controller since this would cause the composite mask to become "1111" causing cache memory deadlock.

In step 11, a cache hit occurs on line 1. The MRU bit for line 1 is set to "1" indicating that it has been used recently. Still, only cache memory line 0 is available. In step 12, the user finally unlocks the cache memory line 2 by unlocking line 2. The composite mask now becomes "1010", indicating that lines 0 and 2 are now available for replacement. In step 13, when a hit occurs on line 0, the MRU bit for line 0 is set to "1". Unlike step 10, the setting of line 0's MRU bit will now not cause deadlock because additional lines have been unlocked.

As noted earlier, a distinctive advantage gained by utilizing the locking mechanism in the cache system of the present invention is the added intelligence provided to the cache replacement process. The lock bits are set by the application process thereby eliminating the intelligence required to try to provide that knowledge at the cache controller level. One way to provide the request to lock certain cache memory lines is for the application program to program such request into the application program in the form of a predetermined command or subroutine call. If the programmer knows that certain variables or memory locations are to be accessed frequently during the execution of the program, after the first access, a special command may be issued to set the corresponding lock bit. The compiler compiling this program will recognize the command request and provide the proper code to execute the command.

System Programs, such as operating system routines, some database or window system routines may be used for controlling the locking as set forth in the present invention. Locking performed in the system programs boosts the performance of some key features used by application programs without any intervention from the application programmer. For example, a programmer building a graphics package might use an efficient line drawing function provided by the operating system's graphics library. If this function were locked into the cache, the speed of execution of the graphics package can be indirectly increased.

Preferably, the locking mechanism of the present invention has been provided for use through special assembly language instructions available for execution in supervisor mode only. A system call providing the lock and unlock line commands can easily be written to help a programmer. This is a very powerful mechanism and should be used by a knowledgeable programmer only. For example, in the SPARC ™ (SPARC is a trademark of SPARC International, Inc.) architecture a load/store instruction can be adapted to modify the lock bits. One way to adapt the load/store command is by reserving an ASI value to correspond to the location of the lock bits. When the CPU executes the instruction, the cache controller receives a command from the CPU to unlock/lock certain lock bits. The cache controller responds by issuing a command to set/reset specified lock bits in the tag array. For further information regarding the load/store instruction see, *The SPARC Architecture Manual*, Version 8, pp. 45–49 (Prentiss Hall 1992).

Alternately, it is preferred that intelligent compilers are provided that perform an automated analysis on the memory accesses to be performed to determine those memory accesses of high frequency which would benefit by having the corresponding lock bit set. A command can then be automatically inserted into the compiled code to perform the locking and subsequently, the unlocking of the lock bits. This technique is advantageous as the decision whether to lock certain accesses in the cache is automatically determined by the compiler and would release the application programmer from making such a decision.

Cache systems implementing the PLRU with locking feature as described above can exhibit significantly lower cache memory miss rates than ordinary PLRU cache systems. The gained efficiency is due to the "intelligence" added to the cache replacement heuristic. The foregoing has described a method and apparatus for implementing a cache memory system with a pseudo-LRU replacement scheme with a locking feature. It is contemplated that changes and modifications may be made by one of ordinary skill in the art, to the materials and arrangements of elements of the present invention without departing from the spirit and scope of the invention.

We claim:

1. In a computer system comprising master devices including a central processing unit (CPU), and a memory system comprising a main memory having a plurality of lines and a cache memory wherein a subset of the lines of main memory are stored in the cache memory for fast access by a master device issuing a request for access to said memory system, an apparatus for securing selected lines of main memory in cache memory comprising:

a tag table comprising tag bits for each cache line, at least one replacement bit for each cache line, and at least one lock bit for each cache line of the cache memory, said tag bits identifying the line of main memory located in cache memory;

a composite bit for each cache line, each composite bit comprising a logical OR of said at least one replacement bit for a cache line and said at least one lock bit for a cache line;

replacement bit circuitry for controlling the states of the at least one replacement bit for each cache line located in the tag table, said replacement bit circuitry setting the at least one replacement bit for a cache line when said cache line is accessed;

lock bit circuitry for controlling the states of the at least one lock bit for each cache line located in the tag table;

composite bit circuitry for monitoring the composite bits to prohibit all composite bits from being set by clearing the at least one replacement bit for each cache line to avoid deadlock;

cache memory replacement circuitry for replacing a line of memory located in the cache memory with a different line of memory, said cache memory replacement circuitry prohibited from replacing a line of cache memory if the corresponding composite bit is set, said cache memory replacement circuitry controlled such that by setting the corresponding at least one lock bit for a cache line in the tag table, a line of memory located in the cache memory is secured in the cache memory regardless of a cache replacement algorithm, and by setting the corresponding at least one replacement bit for a cache line in the tag table, a cache memory line is not replaced regardless of the lock bit.

2. The apparatus as set forth in claim 1, wherein said cache memory replacement circuitry selects a line of the cache memory with a clear composite bit to replace, and said cache memory replacement circuitry clears said at least one replacement bit for each cache line if only one cache line has a clear composite bit to prohibit all composite bits from being set.

3. The apparatus as set forth in claim 2, wherein said lock bit circuitry identifies at least one predetermined line of the cache as non-lockable such that deadlock is avoided.

4. The apparatus as set forth in claim 1, wherein said cache memory replacement circuitry comprises a cache controller.

5. The apparatus as set forth in claim 1, wherein said lock bit circuitry for controlling the state of the at least one lock bit for each cache line is controlled by instructions issued by the master device.

6. The apparatus as set forth in claim 1, wherein said lock bit circuitry for controlling the state of the at least one lock bit for each cache line is controlled by instructions issued by an application process executing on the computer system.

7. The apparatus as set forth in claim 5, wherein said instructions are processed by an operating system of the computer system to issue commands to a cache controller to set or rest the at least one lock bit for a cache line.

8. The apparatus as set forth in claim 5, further comprising a compiler to compile a program to generate compiled code to be executed, said compiler evaluating the program and inserting commands to set and reset the at least one lock bit for a cache line in the compiled code.

9. In a computer system comprising master devices including a central processing unit (CPU), and a memory system comprising a main memory having a plurality of lines and a cache memory and a tag table associated with the cache memory, wherein a subset of the lines of main memory are stored in the cache memory for fast access by a master device issuing a request for access to said memory system, said tag table comprising tag bits, said tag bits identifying lines of main memory located in the cache memory, a method for securing selected lines of main memory in the cache memory comprising:

providing at least one replacement bit for each cache line and at least one lock bit for each cache line of the cache memory in the tag table;

combining the at least one replacement bit for each cache line and the at least one lock bit for each cache line with a logical OR to produce a composite bit for each cache line;

controlling the state of the at least one replacement bit for each cache line and the state of the at least one lock bit for each cache line located in the tag table;

monitoring the composite bit of each cache line to prohibit all composite bits from being set by clearing the at least one replacement bit for each cache line to avoid deadlock; and replacing a line of cache memory with a different line of memory, only if the cache memory line has a clear composite bit, said replacing a line of cache memory controlled such that by setting the corresponding at least one lock bit for a cache line in the tag table, lines of memory located in the cache memory are secured in the cache memory regardless of a cache replacement algorithm used, and by setting the corresponding at least one replacement bit for a cache line in the tag table, cache memory lines are not replaced regardless of the lock bit.

10. The method as set forth in claim 9, wherein the step of controlling the state of the at least one lock bit for each cache line comprises providing instructions that set or reset the at least one lock bit for a cache line in an application process executing in the computer system.

11. The method as set forth in claim 10, wherein the step of controlling the state of the at least one lock bit for each cache line further comprises issuing commands that set or reset the at least one lock bit for a cache line in the tag table when an instruction in the application program to set or reset the at least one lock bit for a cache line is executed.

12. The method as set forth in claim 9, wherein the at least one lock bit for a cache line is set or reset during the execution of a program on the computer system, said method further comprising the step of compiling the program into compiled code to be executed, said step comprising:

evaluating the program to determine when the at least one lock bit for a cache line is to be set or reset for certain lines of memory placed in the cache memory;

inserting commands to set or reset the at least one lock bit for a cache line in the cache memory into the compiled code; and generating compiled code comprising the program and commands to set or reset the at least one lock bit for a cache line.

13. In a computer system comprising master devices including a central processing unit (CPU), and a memory system comprising a main memory having a plurality of lines and a cache memory wherein a subset of the lines of main memory are stored in the cache memory for fast access by a master device issuing a request for access to said memory system, an apparatus for securing selected lines of main memory in cache memory comprising:

a tag table comprising tag bits for each cache line, at least one replacement bit for each cache line, and at least one lock bit for each cache line of the cache memory, said tag bits identifying the line of main memory located in cache memory;

a composite bit for each cache line, each composite bit comprising a logical OR of said at least one replacement bit for a cache line and said at least one lock bit for a cache line;

an operating system for issuing commands to set or reset the at least one lock bit for a cache line located in the tag table; and a cache controller to control the contents of the cache memory and the tag table, said cache controller executing a replacement algorithm to replace a line of memory located in the cache memory with a different line of memory and updating the tag table, said cache controller prohibited from replacing a line of memory in the cache if the corresponding composite bit for said line of memory in the cache in the tag table is set, said cache controller clearing said at least one replacement bit for each cache line if all of said composite bits are set, said cache controller controlled such that by setting the corresponding at least one lock bit for a cache line in the tag table, lines of memory located in the cache memory are secured in the cache memory regardless of a cache replacement algorithm used, and by setting the corresponding at least one replacement bit for a cache line in the tag table, cache memory lines are not replaced regardless of the lock bit.

* * * * *